(12) United States Patent
Umeyama et al.

(10) Patent No.: US 10,944,086 B2
(45) Date of Patent: Mar. 9, 2021

(54) SEPARATOR FOR BATTERY, LAMINATED SEPARATOR, LITHIUM ION SECONDARY BATTERY, AND BATTERY PACK

(71) Applicant: TOYOTA JIDOSHA KABUSHIKI KAISHA, Toyota (JP)

(72) Inventors: Hiroya Umeyama, Okazaki (JP); Harunari Shimamura, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 558 days.

(21) Appl. No.: 15/519,420

(22) PCT Filed: Oct. 16, 2015

(86) PCT No.: PCT/IB2015/001913
§ 371 (c)(1),
(2) Date: Apr. 14, 2017

(87) PCT Pub. No.: WO2016/059466
PCT Pub. Date: Apr. 21, 2016

(65) Prior Publication Data
US 2017/0244086 A1   Aug. 24, 2017

(30) Foreign Application Priority Data
Oct. 17, 2014   (JP) .............................. JP2014-212929

(51) Int. Cl.
*H01M 2/16* (2006.01)
*H01M 10/0525* (2010.01)
*H01M 10/0587* (2010.01)

(52) U.S. Cl.
CPC ............. *H01M 2/162* (2013.01); *H01M 2/16* (2013.01); *H01M 2/1606* (2013.01); *H01M 10/0525* (2013.01); *H01M 10/0587* (2013.01)

(58) Field of Classification Search
CPC ...... H01M 2/162; H01M 2/16; H01M 2/1606; H01M 10/0525; H01M 10/0587;
(Continued)

(56) References Cited

U.S. PATENT DOCUMENTS 4,699,858 A    10/1987  Nakao et al.
5,952,120 A *  9/1999   Yu ..................... H01M 2/1653
                                                  429/144

(Continued)

FOREIGN PATENT DOCUMENTS

CN      103298866 A     9/2013
CN      103370810 A     10/2013
(Continued)

OTHER PUBLICATIONS

Qi et al ("Influence of annealing temperature on the lamellar and connecting bridge structure of stretched polypropylene microporous membrane". Polym Int 2015, 64: 446-452) [Year: 2015].*

(Continued)

*Primary Examiner* — Stephen J Yanchuk
(74) *Attorney, Agent, or Firm* — Sughrue Mion, PLLC

(57) ABSTRACT

Provided is a separator for a battery in which, when a ratio of a total length of line segments (Sa), in which an arbitrary straight line (La) intersects with resin fibers (4), to a total length of the straight line (La) on a cross-section of the separator in a thickness direction (TD) is represented by s (%) and when a thickness of the separator is represented by d (μm), $0 < s \leq 100$, $3 \leq d \leq 50$, and $300 \leq d \times s \leq 1500$ are satisfied, the straight line (La) being parallel to a first main surface (40a) and crossing the cross-section.

8 Claims, 15 Drawing Sheets

(58) Field of Classification Search
CPC ............ H01M 2/1602; H01M 2/1613; H01M 2/1626; H01M 2/1633
See application file for complete search history.

(56) References Cited

U.S. PATENT DOCUMENTS

| | | | |
|---|---|---|---|
| 2006/0159998 A1 | 7/2006 | Harada et al. | |
| 2006/0194100 A1 | 8/2006 | Tanaka et al. | |
| 2010/0068613 A1* | 3/2010 | Deguchi | H01M 2/1646 429/129 |
| 2010/0151310 A1 | 6/2010 | Takita et al. | |
| 2010/0151311 A1* | 6/2010 | Usami | D01D 5/0084 429/145 |
| 2011/0111275 A1 | 5/2011 | Kawase | |
| 2011/0223486 A1* | 9/2011 | Zhang | B01D 67/0027 429/247 |
| 2012/0183862 A1* | 7/2012 | Gupta | H01M 2/162 429/254 |
| 2013/0157130 A1 | 6/2013 | Tamaki et al. | |
| 2013/0266874 A1 | 10/2013 | Matsubara et al. | |
| 2013/0316210 A1 | 11/2013 | Morita et al. | |
| 2013/0337311 A1 | 12/2013 | Itou | |
| 2014/0079980 A1* | 3/2014 | Halmo | H01M 2/1653 429/144 |
| 2014/0272526 A1* | 9/2014 | Huang | H01M 2/1666 429/144 |
| 2014/0349195 A1* | 11/2014 | Ogawa | B29C 71/02 429/254 |
| 2015/0129332 A1 | 5/2015 | Seto et al. | |

FOREIGN PATENT DOCUMENTS

| | | |
|---|---|---|
| EP | 0 196 416 B1 | 4/1990 |
| EP | 1619732 A1 | 1/2006 |
| EP | 2056377 A1 | 5/2009 |
| JP | 2006-236991 A | 9/2006 |
| JP | 2008-255202 A | 10/2008 |
| JP | 2013-032545 A | 2/2013 |
| JP | 5164413 B2 | 3/2013 |
| JP | 2013-218898 A | 10/2013 |
| KR | 10-2011-0016967 A | 2/2011 |
| KR | 10-2013-0058054 A | 6/2013 |
| KR | 10-2014-0085337 A | 7/2014 |
| WO | 2012/090632 A1 | 7/2012 |
| WO | 2012/111077 A1 | 8/2012 |
| WO | 2014/024425 A1 | 2/2014 |

OTHER PUBLICATIONS

Qi et al (Influence of annealing temperature of the lamellar and connecting bridge structure of stretched prolypropylene microporous membrane. Poly mint 2015; 64, 446-452).*
Partial Translation of Office Action dated May 30, 2018 from the Korean Intellectual Property Office in counterpart KR Application No. 10-2017-7010236.

* cited by examiner

FIG. 14

Table1

| SAMPLE | SEPARATOR FOR BATTERY | | | | | | | | | | | BATTERY | EVALUATION | |
|---|---|---|---|---|---|---|---|---|---|---|---|---|---|---|
| | | SUBSTRATE | | | | | | | POROUS LAYER | | | INPUT AND OUTPUT TEST | OVERCHARGE TEST |
| | LAMINATION CONFIGUR-ATION | RESIN FIBER | MANUFACTURING CONDITIONS | | THICKNESS d | RESIN OCCUPANCY s | d×s | LINEARITY INDEX | THICKNESS | FILLER | RESTRAINING PRESSURE | IV RESISTANCE INCREASE | TEMPERATURE INCREASE AFTER SD |
| | | | DRAW RATIO | ANNEALING TEMPERATURE | | | | | | | | | |
| - | - | - | - | °C | μm | % | - | % | μm | - | kN/cm² | % | % |
| A1 | SINGLE LAYER | PE | 2.2 | 95 | 25 | 23 | 575 | 80 | 3 | BOEHMITE | 0.05 | 34 | 35 |
| A2 | SINGLE LAYER | PE | 2.1 | 100 | 25 | 34 | 855 | 82 | 3 | ALUMINA | 0.1 | 37 | 30 |
| A3 | SINGLE LAYER | PE | 2.0 | 105 | 25 | 48 | 1206 | 90 | 3 | BOEHMITE | 0.3 | 47 | 24 |
| A4 | SINGLE LAYER | PE | 1.9 | 110 | 25 | 60 | 1500 | 96 | 3 | ALUMINA | 0.4 | 50 | 13 |
| A5 | SINGLE LAYER | PE | 2.2 | 94 | 20 | 25 | 500 | 80 | 5 | BOEHMITE | 0.05 | 33 | 37 |
| A6 | SINGLE LAYER | PE | 2.1 | 99 | 20 | 36 | 720 | 85 | 5 | BOEHMITE | 0.1 | 40 | 30 |
| A7 | SINGLE LAYER | PE | 2.0 | 104 | 20 | 55 | 1100 | 93 | 5 | BOEHMITE | 0.4 | 48 | 22 |
| A8 | SINGLE LAYER | PE | 1.9 | 109 | 20 | 70 | 1400 | 98 | 5 | BOEHMITE | 0.5 | 53 | 20 |
| A9 | SINGLE LAYER | PE | 2.2 | 93 | 18 | 27 | 486 | 80 | 5 | BOEHMITE | 0.05 | 31 | 38 |
| A10 | SINGLE LAYER | PE | 2.1 | 98 | 18 | 37 | 666 | 82 | 5 | ALUMINA | 0.1 | 33 | 33 |
| A11 | SINGLE LAYER | PE | 2.0 | 103 | 18 | 56 | 1008 | 93 | 5 | BOEHMITE | 0.4 | 46 | 24 |
| A12 | SINGLE LAYER | PE | 1.9 | 108 | 18 | 71 | 1278 | 98 | 5 | BOEHMITE | 0.5 | 51 | 18 |
| A13 | SINGLE LAYER | PE | 2.2 | 92 | 16 | 24 | 384 | 80 | 7 | BOEHMITE | 0.05 | 30 | 39 |
| A14 | SINGLE LAYER | PE | 2.1 | 97 | 16 | 38 | 608 | 82 | 7 | ALUMINA | 0.1 | 32 | 36 |
| A15 | SINGLE LAYER | PE | 2.0 | 102 | 16 | 59 | 944 | 93 | 7 | BOEHMITE | 0.4 | 45 | 27 |
| A16 | SINGLE LAYER | PE | 1.9 | 107 | 16 | 72 | 1152 | 98 | 7 | BOEHMITE | 0.5 | 47 | 22 |
| A17 | SINGLE LAYER | PE | 2.2 | 90 | 12 | 25 | 300 | 80 | 9 | BOEHMITE | 0.05 | 28 | 40 |
| A18 | SINGLE LAYER | PE | 2.1 | 95 | 12 | 35 | 421 | 85 | 9 | BOEHMITE | 0.1 | 35 | 36 |
| A19 | SINGLE LAYER | PE | 2.0 | 100 | 12 | 48 | 579 | 90 | 9 | BOEHMITE | 0.3 | 41 | 31 |
| A20 | SINGLE LAYER | PE | 1.9 | 105 | 12 | 75 | 900 | 98 | 9 | BOEHMITE | 0.5 | 45 | 20 |

FIG. 15

Table2

| SAMPLE | SEPARATOR FOR BATTERY ||||||||| BATTERY | EVALUATION ||
| | LAMINATION CONFIGUR-ATION | SUBSTRATE |||||| POROUS LAYER || | INPUT AND OUTPUT TEST | OVERCHARGE TEST |
| | | RESIN FIBER | MANUFACTURING CONDITIONS || THICKNESS d | RESIN OCCUPANCY s | dxs | LINEARITY INDEX | THICKNESS | FILLER | RESTRAINING PRESSURE | IV RESISTANCE INCREASE | TEMPERATURE INCREASE AFTER SD |
| | | | DRAW RATIO | ANNEALING TEMPERATURE | | | | | | | | | |
| — | — | — | — | — | °C | μm | % | — | % | μm | — | kN/cm² | % | % |
| B1 | SINGLE LAYER | PE | 2.5 | 110 | 25 | 70 | 1750 | 98 | 3 | BOEHMITE | 0.5 | 200 | 120 |
| B2 | SINGLE LAYER | PE | 2.0 | 118 | 20 | 20 | 400 | 55 | 5 | BOEHMITE | 0.05 | 93 | 65 |
| B3 | SINGLE LAYER | PE | 2.0 | 115 | 16 | 20 | 320 | 65 | 7 | BOEHMITE | 0.05 | 90 | 62 |
| B4 | SINGLE LAYER | PE | 1.5 | 117 | 12 | 20 | 240 | 70 | 9 | BOEHMITE | 0.05 | 140 | 110 |

FIG. 16

Table3

| SAMPLE | | LAMINATION CONFIGUR-ATION | RESIN FIBER | MANUFACTURING CONDITIONS DRAW RATIO | MANUFACTURING CONDITIONS ANNEALING TEMPERATURE (°C) | SUBSTRATE THICKNESS d (μm) | SUBSTRATE RESIN OCCUPANCY s (%) | d×s | LINEARITY INDEX (%) | POROUS LAYER THICKNESS (μm) | POROUS LAYER FILLER | BATTERY RESTRAINING PRESSURE (kN/cm²) | EVALUATION INPUT AND OUTPUT TEST IV RESISTANCE INCREASE (%) | EVALUATION OVERCHARGE TEST TEMPERATURE INCREASE AFTER SD (%) |
|---|---|---|---|---|---|---|---|---|---|---|---|---|---|---|
| A21 | | FIRST AND THIRD LAYERS | PP | 2.1 | 102 | 8 | 48 | 384 | 87 | 3 | BOEHMITE | 0.2 | 43 | 26 |
| | | SECOND LAYER | PE | | | 5.5 | 24 | | | | | | | |
| A22 | | FIRST AND THIRD LAYERS | PP | 2.0 | 104 | 7 | 50 | 744 | 96 | 9 | ALUMINA | 0.4 | 44 | 21 |
| | | SECOND LAYER | PE | | | 12 | 62 | | | | | | | |
| A23 | | FIRST AND THIRD LAYERS | PP | 1.9 | 106 | 5 | 55 | 826 | 96 | 5 | ALUMINA | 0.4 | 49 | 17 |
| | | SECOND LAYER | PE | | | 14 | 59 | | | | | | | |
| A24 | | FIRST AND THIRD LAYERS | PP | 2.0 | 104 | 10 | 69 | 690 | 87 | 7 | BOEHMITE | 0.2 | 40 | 33 |
| | | SECOND LAYER | PE | | | 7 | 39 | | | | | | | |
| A25 | | FIRST AND THIRD LAYERS | PP | 2.1 | 102 | 6 | 25 | 410 | 87 | 9 | BOEHMITE | 0.2 | 38 | 34 |
| | | SECOND LAYER | PE | | | 10 | 41 | | | | | | | |
| B5 | | FIRST AND THIRD LAYERS | PP | 1.5 | 115 | 7 | 30 | 210 | 50 | 3 | BOEHMITE | 0.05 | 150 | 80 |
| | | SECOND LAYER | PE | | | 6 | 25 | | | | | | | |

SEPARATOR FOR BATTERY, LAMINATED SEPARATOR, LITHIUM ION SECONDARY BATTERY, AND BATTERY PACK

CROSS REFERENCE TO RELATED APPLICATIONS

This application is a National Stage of International Application No. PCT/IB2015/001913 filed Oct. 16, 2015, claiming priority based on Japanese Patent Application No. 2014-212929 filed Oct. 17, 2014, the contents of all of which are incorporated herein by reference in their entirety.

BACKGROUND OF THE INVENTION

1. Field of the Invention

The present invention relates to a separator for a battery, a laminated separator, a lithium ion secondary battery, and a battery pack.

2. Description of Related Art

Japanese Patent Application Publication No. 2006-236991 (JP 2006-236991 A) discloses a separator for a battery including: ultrafine fibers having a fiber diameter of 3 μm or less; and quasi-ultrafine modified cross-section fibers having a fiber diameter of 3 μm to 5 μm and a non-circular shape in cross-section.

In many cases, a lithium ion secondary battery for a vehicle is used in the form of a battery pack in which plural single cells are connected and restrained by a restraining member. In the battery pack, each of the single cells is pressed by the restraining member at a predetermined pressure (hereinafter, referred to as "restraining pressure"). It is empirically known that, in the battery which is used in such a restrained environment, deterioration in input and output characteristics or micro-short-circuiting is likely to occur as compared to a battery (for example, a small-sized battery for consumer use) which is used in a non-restrained state.

JP 2006-236991 A describes that the separator is formed of plural ultrafine fibers having substantially the same fiber diameter; as a result, the separator has a uniform pore size and a uniform internal space, and thus ion permeability is improved. Due to the binding between the quasi-ultrafine modified cross-section fibers, the distance between electrodes is not likely to be narrowed by a pressure applied during battery construction or the like, that is, the thickness of the separator can be maintained.

However, in the above-described battery pack, not the temporary pressure assumed in JP 2006-236991 A but the continuous restraining pressure is applied to the single cells. Likewise, the continuous pressure is also applied to the separator. Further, when electrode plates expand due to repeated charging and discharging, the separator is further pressed. In this case, some portions of the separator collapse even when the separator has a uniform pore size and a uniform internal space at first, and a pore path is formed in a zigzag shape. As a result, the permeation of lithium ions (Li$^+$) is inhibited, and input and output characteristics deteriorate. Further, in the collapsed portions of the separator, the resistance locally increases. Therefore, the current is concentrated on portions of the separator other than the collapsed portions, and thus the risk of micro-short-circuiting and the like may increase.

SUMMARY OF THE INVENTION

The invention provides a separator for a battery having superior input and output characteristics and safety; and a laminated separator, a lithium ion secondary battery, and a battery pack in which the separator is used.

[1] According to a first embodiment of the invention, there is provided a separator for a battery including: a first main surface; a second main surface that is positioned on a side opposite the first main surface; and plural resin fibers by which the first main surface and the second main surface are connected. When a ratio of a total length of line segments, in which an arbitrary straight line intersects with the resin fibers, to a total length of the straight line on a cross-section of the separator for the battery in a thickness direction is represented by s (%) and when a thickness of the separator for the battery is represented by d (μm), 0<s≤100, 3≤d≤50, and 300≤d×s≤1500 are satisfied, the straight line being parallel to the first main surface and crossing the cross-section. In the cross-section, when a straight line which is positioned inside from the first main surface at a distance of 10% of the thickness among straight lines parallel to the first main surface and crossing the cross-section is set as a first reference line, when a straight line which is positioned inside from the second main surface at a distance of 10% of the thickness among the straight lines parallel to the first main surface and crossing the cross-section is set as a second reference line, when a line segment in which each of the resin fibers intersects with the first reference line is set as a first line segment, and when a line segment in which a band-shaped region extending from the first line segment in the thickness direction intersects with the second reference line is set as a second line segment, a third line segment in which each of the resin fibers intersects with the second line segment accounts for 80% or higher of the second line segment.

In a separator for a battery (hereinafter, also referred to simply as "separator") of the related art, a configuration in which a pore path is linear is avoided. When a separator in which a pore path is linear collapses, the risk of micro-short-circuiting increases. However, in the above-described configuration, the pore path is intentionally made to be linear. That is, referring to FIG. 3, in the above-described separator for a battery, each of resin fibers 4 on a cross-section in a thickness direction TD intersects with a first reference line LI to form a first line segment S1 and also intersects with a second line segment S2 in which a band-shaped region R extending from the first line segment S1 in the thickness direction intersects with a second reference line L2. At this time, a third line segment S3 in which each of the resin fibers 4 intersects with the second line segment S2 accounts for 80% or higher of the second line segment S2.

Here, the first reference line L1 is positioned inside from the first main surface 40a at a distance of 10% of the thickness of the separator (that is, near the first main surface 40a). The second reference line L2 is positioned inside from the second main surface 40b at a distance of 10% of the thickness of the separator (that is, near the second main surface 40b). The first line segment S1 and the second line segment S2 are included in the single band-shaped region R linearly extending in the thickness direction TD. Accordingly, the ratio of the third line segment S3 to the second line segment S2 can be considered as an index indicating the linearity of the resin fibers 4. Hereinafter, in this specification, this ratio will be referred to as "linearity index". As described below, it is preferable that the linearity index is calculated from plural resin fibers.

Referring to FIG. 3, in the separator in which the resin fibers 4 are linear, pores 2 adjacent to the resin fibers 4 also extend linearly. According to study by the present inventors, when the linearity index is 80% or higher, a large number of linear pore paths are formed, and ion permeability is significantly improved. As a result, the input and output characteristics of a battery can be improved.

However, as described above, when a pore path is linear, the risk of micro-short-circuiting and the like should be considered. Therefore, in the above-described separator for a battery, the occupancy of the resin fibers and the thickness of the separator are limited to satisfy a specific relationship. That is, in the above-described separator for a battery, the resin occupancy s (%) and the thickness d (μm) of the separator satisfy relationships of $0<s\leq100$, $3\leq d\leq50$, and $300\leq d\times s\leq 1500$.

According to study by the present inventors, when "d×s" is lower than 300 (typically, when the fiber diameter of the resin fibers is small and a separator is thin), the separator is likely to collapse, and the risk of micro-short-circuiting and the like in the separator in a restrained state may not be sufficiently suppressed. On the other hand, when "d×s" is higher than 1500 (typically, when the fiber diameter of the resin fibers is large and a separator is thick), the separator is not likely to collapse; however, ion permeability is low and desired input and output characteristics cannot be obtained. Therefore, in the above-described separator for a battery, "d×s" is limited to being 300 to 1500. As a result, even when used in a restrained state, the collapsing of the separator is suppressed, safety is secured, and high input and output characteristics can be exhibited due to the linear pore paths.

[2] The separator may further satisfy $20\leq s\leq 80$. By limiting the resin occupancy s to be within the above-described range, a balance between input and output characteristics and safety can be improved.

[3] A fiber diameter of the resin fibers may be 0.05 μm to 2 μm. Within the above-described ranges, resin fibers which are not likely to collapse and are linear can be easily obtained.

[4] The separator may further include a porous layer that is provided on at least one of the first main surface and the second main surface, in which the porous layer includes an inorganic filler and a binder. By the separator further including the porous layer, safety is further improved.

[5] According to a embodiment of the invention, there is provided a laminated separator including the separator according to any one of [1] to [4]. Since the laminated separator includes the above-described separator, input and output characteristics and safety are superior. In the laminated separator, all the layers may be the above-described separators, or a part of the layers may be the above-described separators. That is, it is only necessary that at least one layer is the above-described separator.

Here, in the case of the laminated separator, the resin occupancy s of each layer is measured, and it is necessary that $0<s\leq100$, $3\leq d\leq50$, and $300\leq d\times s\leq 1500$ are satisfied and that the linearity index is 80% or higher only in the layer having the highest resin occupancy s. The movement rate of $Li^+$ is determined in the layer having the highest resin occupancy s and the safety of the entire laminated separator depends on this layer.

[6] According to a embodiment of the invention, there is provided a lithium ion secondary battery including the separator according to any one of [1] to [4] or the laminated separator according to [5]. The lithium ion secondary battery exhibits superior input and output characteristics and safety based on the characteristics of the above-described separator.

[7] When the above-described separator has an elongated belt shape, the lithium ion secondary battery according to [6] may have the following configuration. That is, the lithium ion secondary battery further includes: a flat electrode body in which an elongated belt-shaped positive electrode and an elongated belt-shaped negative electrode are wound together with the separator interposed between the positive electrode and the negative electrode and a square case that accommodates the flat electrode body. The flat electrode body includes a flat portion in which plate portions including the separator, the positive electrode, and the negative electrode are laminated. The square case includes a pair of main surface walls facing the flat portion.

In such a square battery, the flat portion of the flat electrode body comes into direct or indirect contact with the main surface walls of the square case, and thus a pressure is applied to the flat portion from the main surface wall. As a result, the separator may collapse, and input and output characteristics and safety may deteriorate in the related art. However, by using the above-described separator, deterioration in input and output characteristics and safety can be suppressed.

[8] According to a embodiment of the invention, there is a provided a battery pack including plural single cells each of which is the lithium ion secondary battery according to [7]. This battery pack further includes a restraining member that restrains outsides of the single cells. In the battery pack, a pressure of 0.05 $kN/cm^2$ to 0.5 $kN/cm^2$ is applied to the flat portion of the flat electrode body included in each of the single cells.

When a restraining pressure of 0.05 $kN/cm^2$ to 0.5 $kN/cm^2$ is applied to the flat portion of the flat electrode body, the same pressure as described above is applied to the separator included in the flat electrode body in a lamination direction thereof. When a separator of the related art is used in such a restrained environment, input and output characteristics and safety may deteriorate. However, in the above-described separator, deterioration in input and output characteristics and safety is small even in such a restrained environment.

According to the embodiments of the invention, it is possible to provide a separator for a battery having superior input and output characteristics and safety; and a laminated separator, a lithium ion secondary battery, and a battery pack in which the separator is used.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is a table showing the measurement results of Samples A1 to A20 according to an embodiment of the invention;

FIG. 15 is a table showing the measurement results of Samples B1 to B4 according to Comparative Examples; and FIG. 16 is a table showing the measurement results of Samples A21 to A25 according to an embodiment of the invention and Sample B5 according to a comparative example.

DETAILED DESCRIPTION OF EMBODIMENTS

Hereinafter, embodiments of the invention (hereinafter, referred to as "the embodiments") will be described in detail. However, the embodiments are not limited to the following description.

First Embodiment: Separator for Battery

Figure 1:
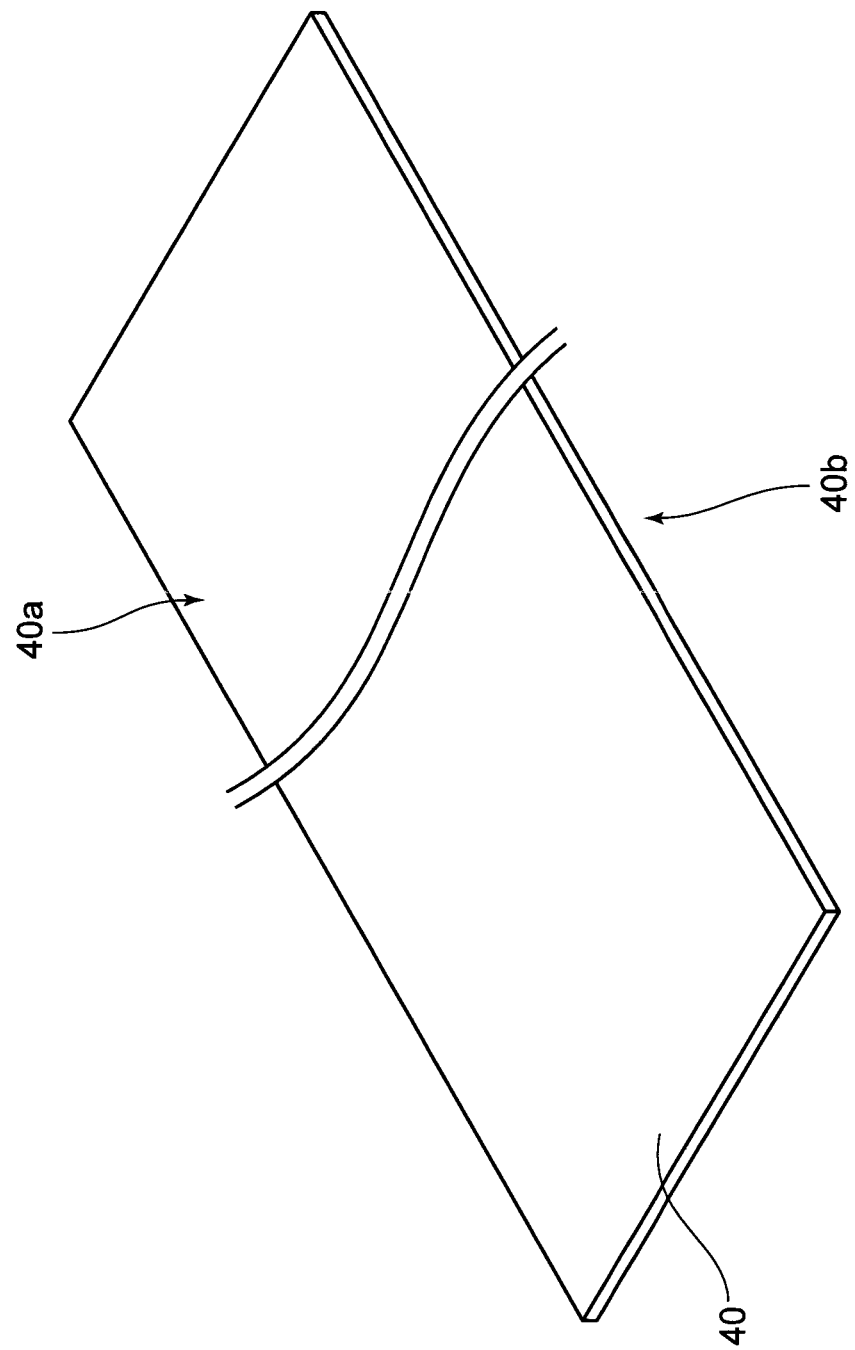
FIG. 1 is a schematic diagram showing a configuration example of a separator for a battery according to an embodiment of the invention.

A first embodiment relates to a separator for a battery. FIG. 1 is a schematic diagram showing a configuration of a separator 40 for a battery. Referring to FIG. 1, the separator 40 for a battery is typically an elongated belt-shaped sheet member and includes a first main surface 40a and a second main surface 40b that is a back surface of the separator.

Figure 2:
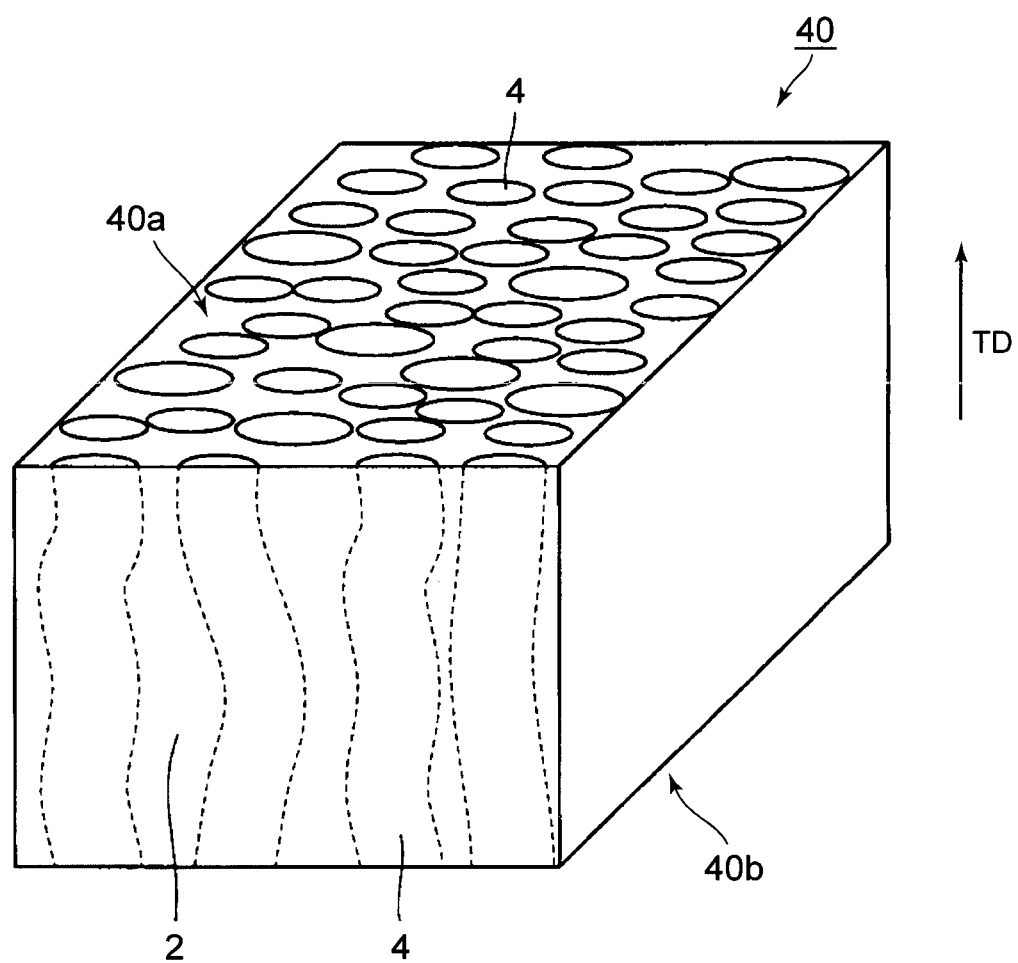
FIG. 2 is a schematic diagram showing a configuration example of major components of the separator for a battery according to the embodiment of the invention.

FIG. 2 is a schematic diagram showing a configuration example of major components of the separator 40 for a battery. Referring to FIG. 2, the separator 40 for a battery includes: plural resin fibers 4 by which the first main surface 40a and the second main surface 40b are connected; and pores 2 that are adjacent to the resin fibers 4. In the embodiment, a resin occupancy s, the thickness d of the separator, and a linearity index satisfy specific conditions. As a result, high input and output characteristics and safety are exhibited.

[Cross-Sectional Analysis]

The resin occupancy s and the like can be obtained by obtaining an image of a cross-section of the separator 40 for a battery cut in a thickness direction thereof and analyzing the image of the cross-section using a scanning electron microscope (SEM). Collection positions of samples for analysis are arbitrary. In the case of an elongated belt-shaped separator (referring to FIG. 1), a sample may be collected from the center of each of three regions into which the separator is divided in a longitudinal direction. It is preferable that an arithmetic mean value of the resin occupancy s or the like obtained from the respective samples is obtained.

The size (plan view) of the sample cut from the separator is, for example, about 5 mm×5 mm. A cross-section of the sample can be obtained by processing the sample using a cross-section polisher (CP), a focused ion beam (FIB) device, and the like. At this time, it is preferable that conditions are adjusted such that thermal damage to the sample is reduced. When the CP is used, preferable processing conditions are, for example, as follows.

(CP Processing Conditions)

Accelerating voltage: about 3 kV to 6 kV

Ion current: about 100 μA to 500 μA

Processing time: about 3 min to 12 min

Processing method: cross-section processing is performed while performing cooling (so-called cryogenic processing)

When the FIB is used, preferable processing conditions are, for example, as follows.

(FIB Processing Conditions)

Accelerating voltage: about 10 kV to 50 kV

Beam current: about 0.05 nA to 5 nA

Beam diameter: about 0.02 μm to 0.3 μm

Processing time: about 0.1 hr to 10 hr

Processing method: cross-section processing is performed while performing cooling or without performing cooling Next, after the cross-section processing, the sample undergoes conductive processing. For example, using a commercially available ion sputtering device, the cross-section as an observation surface may be coated with a conductive material (for example, osmium (Os)). At this time, preferable processing conditions are, for example, as follows.

(Conductive Processing Conditions)

Vacuum degree: about 7 Pa

Discharge current: lower than about 40 mA

Processing time: several seconds

The cross-section sample obtained through the above-described processes is observed using a SEM to obtain a cross-sectional SEM image. At this time, the observation magnification is, for example, about 10,000 times to 30,000 times and is appropriately adjusted depending on the thickness of the separator, the fiber diameter of the resin fibers, and the like. For example, the observation magnification may be adjusted such that the image contains about 15 resin fibers. The accelerating voltage during the observation is, for example, about 3 kV.

(Measurement of Resin Occupancy s)

Figure 3:
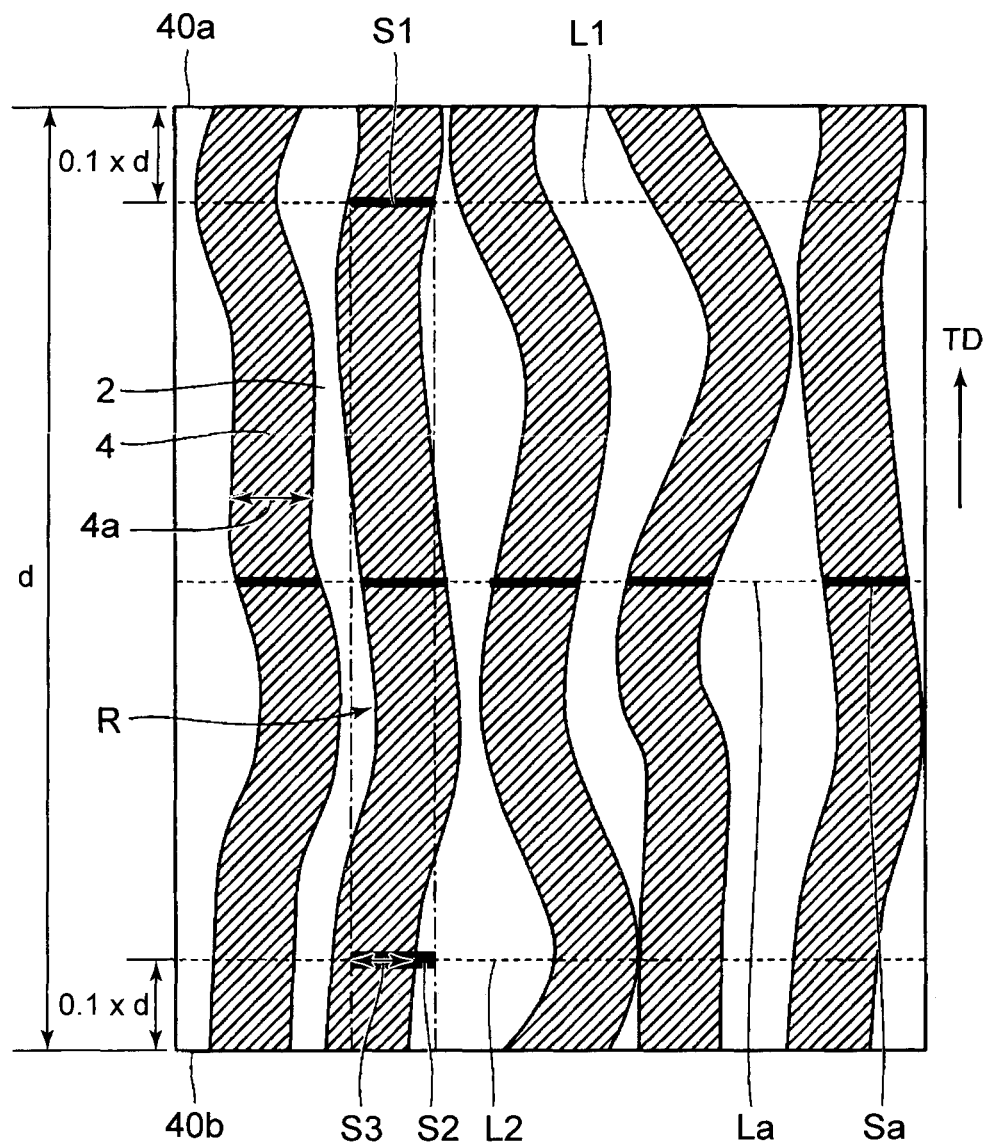
FIG. 3 is a schematic diagram showing an example of a cross-sectional SEM image of the separator for a battery according to the embodiment of the invention in a thickness direction thereof.

FIG. 3 is a schematic diagram showing an example of a cross-sectional SEM image of the separator for a battery. The resin occupancy s is measured as follows using the cross-section. First, a straight line La parallel to the first main surface 40a and crossing the cross-sectional SEM image is set. Next, the total length of line segments Sa in which the straight line La intersects with the resin fibers 4 is measured. The obtained total length of the line segments Sa is divided by the total length of the straight line La to calculate a resin occupancy s (%). A position of the straight line La in a thickness direction TD is arbitrary. It is preferable that the total length of the straight line La can be measured by performing the measurement at about three positions including the center in the thickness direction TD and obtaining the average value thereof. The resin occupancy s is necessarily higher than 0% and 100% or lower and is preferably 20% to 80% and more preferably 30% to 70%. Within the above-described range, a balance between input and output characteristics and safety can be improved.

(Measurement of Thickness d of Separator for Battery)

The thickness d of the separator 40 for a battery may be measured using a general film thickness meter. The film thickness meter may be a contact type or a non-contact type (for example, an infrared type). Of course, the thickness d may be measured using the cross-sectional SEM image. It is preferable that the thickness d is obtained by performing the measurement three times and obtaining the average value thereof. The thickness d is necessarily 3 µm to 50 µm. When the thickness d is less than 3 µm, sufficient safety cannot be secured; and when the thickness d is more than 50 µm, desired input and output characteristics cannot be obtained. The thickness d is preferably 10 µm to 40 µm, more preferably 10 µm to 30 µm, and still more preferably 15 µm to 25 µm. Within the above-described range, a balance between input and output characteristics and safety can be improved.

In the embodiment, a relationship of 300≤d×s≤1500 is satisfied. As a result, the separator is not likely to collapse, and safety is secured even when a pore path is linear. "d×s" is preferably 400 to 1400, more preferably 500 to 1300, and still more preferably 600 to 1200. Within the above-described range, a balance between input and output characteristics and safety can be improved.

(Measurement of Linearity Index)

Referring to FIG. 3 again, the linearity index is measured as follows. First, a first reference line L1 parallel to the first main surface 40a and crossing the cross-sectional SEM image is set at a position positioned inside from the first main surface 40a at a distance of 10% of the thickness d (in FIG. 3, indicated by "0.1×d"). A second reference line L2 parallel to the first main surface 40a and crossing the cross-sectional SEM image is set at a position positioned inside from the second main surface 40b at a distance of 10% of the thickness d. Next, focusing on one resin fiber 4, a line segment in which the resin fiber 4 intersects with the first reference line L1 is specified as a first line segment S1. A band-shaped region R is set so as to extend linearly from the first line segment S1 to the second reference line L2 in the thickness direction TD. A line segment in which the band-shaped region R intersects with the second reference line L2 is specified as a second line segment S2, and the length thereof is measured. Likewise, the length of a line segment (third line segment S3) in which the resin fiber 4 intersects with the second line segment S2 is measured. This operation is repeated on the cross-sectional SEM image, and the total length of the third line segments S3 is divided by the total length of the second line segments S2. As a result, the linearity index (%) can be calculated. The linearity index is calculated from preferably about 15 resin fibers and more preferably 30 resin fibers.

As the linearity index increases, the number of resin fibers linearly extending in the thickness direction TD increases, and high input and output characteristics can be expected. Accordingly, the higher the linearity index, the better, and the linearity index is ideally 100%. The linearity index is preferably 82% or higher, more preferably 85% or higher, and still more preferably 90% or higher.

The cross-section in the thickness direction TD described in the embodiment is preferably substantially perpendicular to the first main surface 40a (or the second main surface 40b) but may not be exactly perpendicular thereto. For example, the cross-section in the thickness direction TD may be tilted by ±3° with respect to the first main surface 40a. Likewise, the straight line parallel to the first main surface 40a may not be exactly parallel thereto. For example, the straight line may be tilted by ±3° with respect to the first main surface 40a.

[Resin Fibers]

The resin fibers are preferably formed of, for example, a polyolefin resin. For example, the resin fibers can be formed of polyethylene (PE) or polypropylene (PP). When PE is used, the weight average molecular weight thereof is, for example, about 20,000 to 1,000,000, and the crystallinity degree thereof is, for example, about 20% to 70%. When PP is used, the weight average molecular weight thereof is, for example, about 40,000 to 900,000, and the crystallinity degree thereof is, for example, about 20% to 70%. Here, "weight average molecular weight" can be measured by gel permeation chromatography (GPC). In addition, "crystallinity degree" can be calculated from a ratio of a heat of fusion ΔH, which is measured according to "JIS-K7121", to a heat of fusion (theoretical value) of a resin formed of perfect crystal.

The fiber diameter of the resin fibers is preferably 0.05 µm to 2 µm, more preferably 0.05 µm to 1 µm, and still more preferably 0.1 µm to 0.8 µm. Within the above-described ranges, resin fibers which are not likely to collapse and are linear can be easily obtained. Here, "fiber diameter" is shown in FIG. 3 as a width 4a of the resin fiber 4 on the cross-sectional SEM image.

Second Embodiment: Laminated Separator

Figure 5:
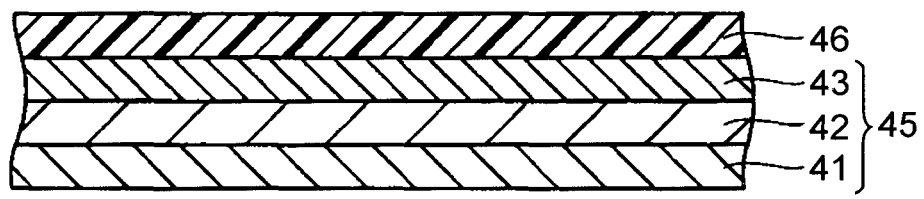
FIG. 5 is a schematic sectional view showing a configuration example of a laminated separator according to an embodiment of the invention.

A second embodiment relates to a laminated separator including the separator 40 for a battery. FIG. 5 is a schematic sectional view showing a configuration example of the laminated separator 45. Referring to FIG. 5, the laminated separator 45 has a structure in which a first layer 41, a second layer 42, and a third layer 43 are laminated in this order. In this example, the number of layers laminated is three. However, the number of layers laminated is not particularly limited as long as it is two or more. However, the number of layers laminated is preferably 5 or more in consideration of productivity and is most preferably 3 or more in consideration of the shape stability and the like.

In the laminated separator 45, at least one of the first layer 41, the second layer 42, and the third layer 43 is the separator 40 for a battery. In this case, the resin occupancy s of each layer is measured, and it is necessary that 0<s≤100, 3≤d≤50, and 300≤d×s≤1500 are satisfied and that the linearity index is 80% or higher only in the layer having the highest resin occupancy s. The movement rate of Li$^+$ is determined in the layer having the highest resin occupancy s and the safety of the entire laminated separator depends on this layer. It is more preferable that the above-described relationships are satisfied in all the layers.

When the laminated separator has a three-layer structure, it is preferable that the first layer 41 and the third layer 43 which are outer layers are PP layers; and the second layer 42 interposed between the first layer 41 and the third layer 43 is a PE layer.

The PE layer has a superior shutdown function but has poor oxidation resistance. By adopting the configuration in which the PE layer is interposed between the PP layers having superior oxidation resistance, a superior shutdown function and high oxidation resistance can be simultaneously realized.

The thickness of the laminated separator 45 is, for example, 10 µm to 50 µM, preferably 15 µm to 40 µm, and more preferably 20 µm to 30 µm. The thickness of each of the layers constituting the laminated separator is, for example, 3 μm to 20 μm, preferably 3 μm to 15 μm, and more preferably 5 μm to 10 μm.

[Methods of Manufacturing Separator for Battery and Laminated Separator]

The separator for a battery and the laminated separator described above can be manufactured, for example, as follows. The separator for a battery may be manufactured using a wet method or a dry method. However, it is preferable that the separator for a battery is manufactured using a dry method. For example, using an extruder, a resin raw material is melted and extruded from a tip end of a T die into a sheet shape. As a result, an original sheet which is a precursor of the separator is obtained. Next, the original sheet is drawn and annealed. As a result, a separator for a battery can be manufactured.

Here, drawing may be uniaxial drawing or biaxial drawing but is preferably biaxial drawing. In the case of biaxial drawing, drawing may be simultaneously or sequentially performed in the respective axial directions. The draw ratio and the annealing temperature are appropriately changed according to the kind, molecular weight, or the like of a resin raw material. When the resin raw material is PE or PP, the draw ratio is, for example, about 1.5 times to 3.0 times and preferably about 1.8 times to 2.4 times. The annealing temperature is, for example, about 80° C. to 120° C. and preferably about 90° C. to 110° C. The annealing time is, for example, about 0.1 hr to 1 hr. The thickness of the original sheet is appropriately adjusted according to the desired thickness of the separator. In the case of the laminated separator, original sheet which are individually formed may be bonded to each other. Alternatively, original sheets may be prepared by so-called coextrusion.

[Porous Layer]

Figure 4:
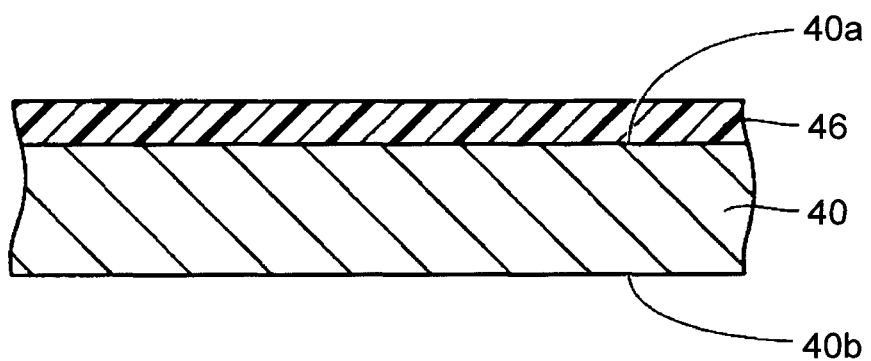
FIG. 4 is a schematic sectional view showing a configuration example of the separator for a battery according to the embodiment of the invention.

Referring to FIGS. 4 and 5, the separator 40 for a battery or the laminated separator 45 may further include a porous layer 46 on a surface thereof. As a result, safety is further improved. In FIG. 4, the porous layer 46 is provided on the first main surface 40a (one surface) of the separator 40 for a battery. However, the porous layer 46 may be provided on both main surfaces of the separator 40 for a battery.

The thickness of the porous layer 46 is, for example, 2 μm to 10 μm, preferably 3 μm to 9 μm, and more preferably 5 μm to 7 μm. Within the above-described range, safety can be improved without an excessive increase in the distance between electrodes.

The porous layer 46 contains an inorganic filler (inorganic compound particles) and a binder. The porous layer 46 may further contain other components as long as it contains the above components. Examples of other components include a thickener and a dispersant. It is preferable that the inorganic filler exhibits heat resistance and chemical stability because it can impart heat resistance and the like to the porous layer 46. As the inorganic filler, for example, alumina ($Al_2O_3$), boehmite (AlO(OH)), titania ($TiO_2$), zirconia ($ZrO_2$), or magnesia (MgO) can be used. Among these inorganic fillers, one kind may be used alone, or two or more kinds may be used in combination.

In consideration of particle shape and the like, alumina and boehmite are particularly preferable as the inorganic filler. The D50 of alumina is preferably about 0.2 μm to 1.2 μm, and the specific surface area thereof is preferably about 1.3 $m^2/g$ to 100 $m^2/g$. The D50 of boehmite is preferably about 0.2 μm to 1.8 μm, and the specific surface area thereof is preferably about 2.8 $m^2/g$ to 100 $m^2/g$. Here, "D50" refers to a particle size corresponding to a cumulative value of 50% in a particle size distribution obtained using a laser diffraction scattering method. "Specific surface area" refers to a value measured using a BET method.

As the binder, for example, an acrylic resin, styrene-butadiene rubber (SBR), a polyolefin resin (for example, PE), polytetrafluoroethylene (PTFE), polyvinylidene fluoride (PVDF), a polyamide resin (for example, poly-N-methyl-N-vinylacetamide), or an aramid resin can be used. The content of the binder in the porous layer 46 is, for example, about 1.0 mass % to 4.5 mass %. However, when an aramid resin is used, the content of the aramid resin in the porous layer 46 is preferably about 30 mass % to 70 mass %.

The porous layer 46 can be formed, for example, as follows. First, the inorganic filler, the thickener, and the binder are kneaded with each other in a solvent to obtain a paste for forming the porous layer 46. For the kneading, for example, an ultrasonic disperser, for example, CLEARMIX (manufactured by M Technique Co., Ltd.) can be used. When an aqueous solvent is used as the solvent for the paste, for example, carboxymethyl cellulose (CMC) or methyl cellulose (MC) can be used as the thickener. When an organic solvent (for example, NMP) is used, for example, the binder such as an acrylic resin also functions as the thickener.

Next, the paste is applied to the first main surface 40a of the separator 40 for a battery and is dried. As a result, the porous layer 46 is formed. An application method is preferably a gravure coating method.

Third Embodiment: Lithium Ion Secondary Battery

A third embodiment relates to a lithium ion secondary battery. The lithium ion secondary battery includes the separator for a battery according to the first embodiment or the laminated separator according to the second embodiment. The lithium ion secondary battery exhibits superior input and output characteristics and safety based on the characteristics of the above-described separator for a battery and the like. Hereinafter, the lithium ion secondary battery will also be abbreviated as "single cell".

Figure 6:
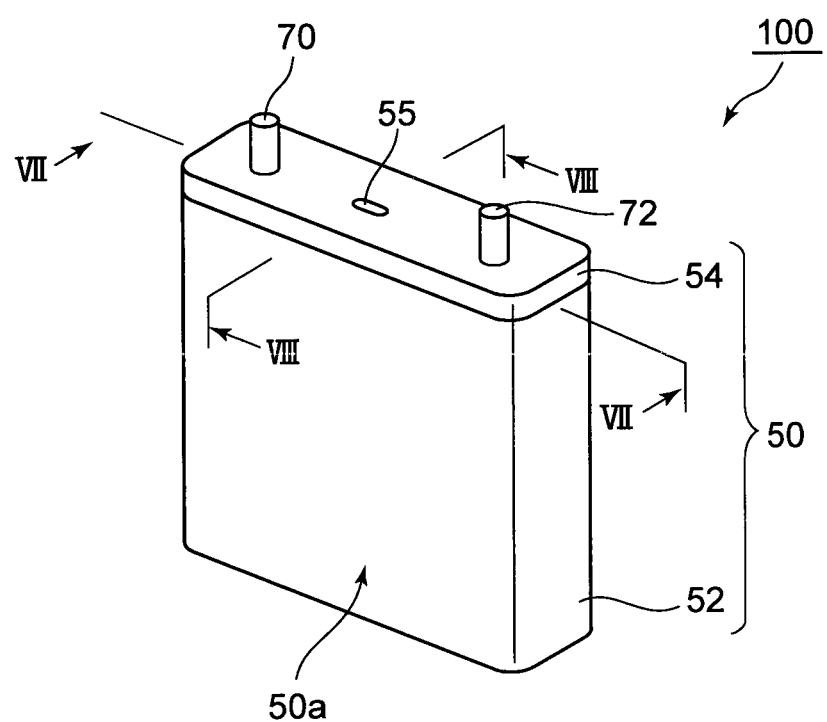
FIG. 6 is a schematic diagram showing a configuration example of a lithium ion secondary battery according to an embodiment of the invention.

FIG. 6 is a schematic diagram showing a configuration example of a lithium ion secondary battery according to the embodiment. Referring to FIG. 6, the single cell 100 is a sealed battery and includes a square case 50. The square case 50 includes: a case 52 that includes a pair of main surface walls 50a; and a lid 54. In the embodiment, the main surface walls 50a refer to side walls which face a flat portion 80a of a flat electrode body 80 described below among all the side walls constituting the square case 50.

The square case 50 is formed of, for example, an aluminum (Al) alloy. The case 52 and the lid 54 are joined to each other by, for example, laser welding. A positive electrode terminal 70 and a negative electrode terminal 72 are provided on the lid 54. A safety valve 55 is adjusted to be open when the internal pressure of the square case 50 reaches a predetermined pressure.

Figure 7:
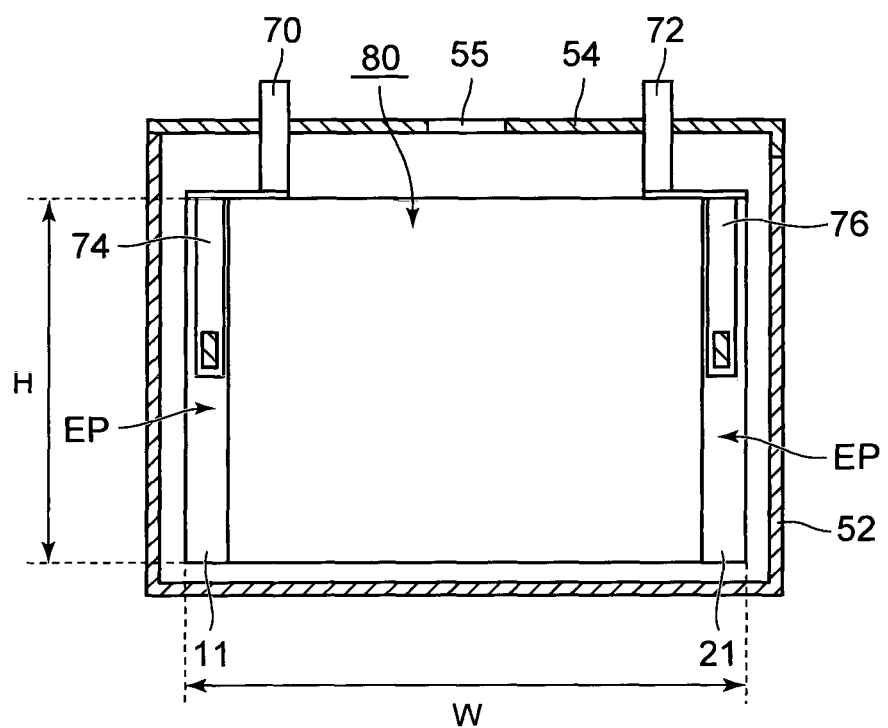
FIG. 7 is a schematic sectional view taken along line VII-VII of FIG. 6.

Next, an internal structure of the single cell 100 will be described. FIG. 7 is a schematic sectional view of the single cell 100 taken along line VII-VII of FIG. 6. Referring to FIG. 7, the single cell 100 includes a flat electrode body 80 and an electrolytic solution (not shown). The flat electrode body 80 includes exposure portions EP, in which a positive electrode current collector foil 11 or a negative electrode current collector foil 21 is exposed, at opposite ends in a width direction thereof. The exposure portion EP on a positive electrode 10 side is electrically connected to the positive electrode terminal 70 through a positive electrode current collector plate 74. Likewise, the exposure portion EP on a negative electrode 20 side is electrically connected to the negative electrode terminal 72 through a negative electrode current collector plate 76. In this way, a conductive path ranging from the respective terminals to the flat electrode body 80 is formed.

[Flat Electrode Body]

Figure 9:
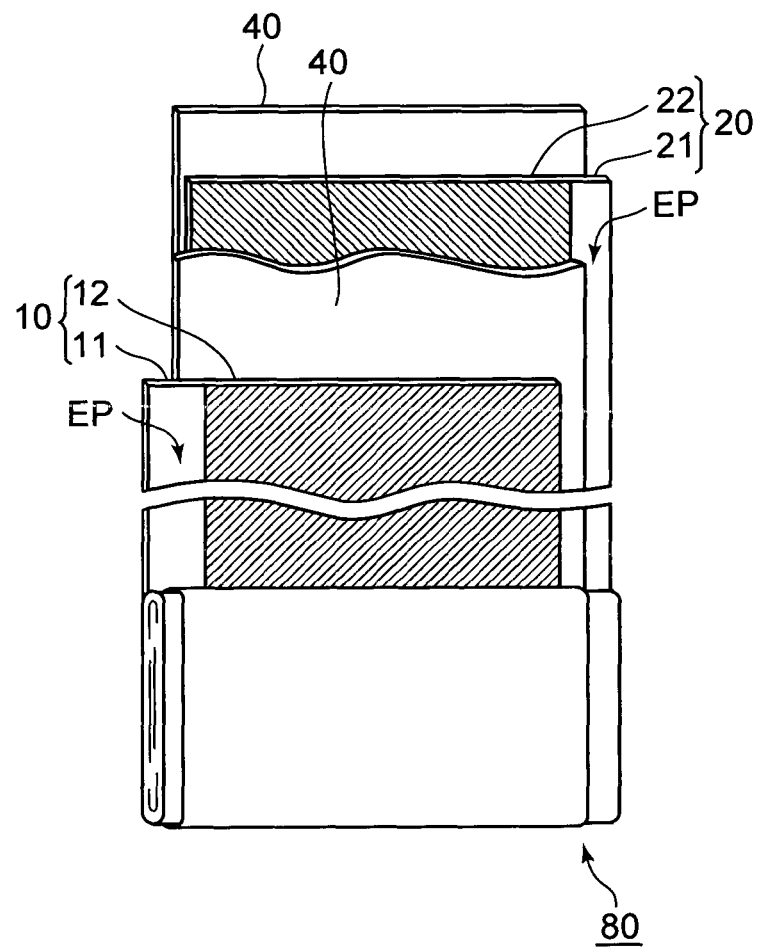
FIG. 9 is a schematic diagram showing a configuration example of a flat electrode body according to an embodiment of the invention.

FIG. 9 is a schematic diagram showing a configuration example of the flat electrode body 80. Referring to FIG. 9, the flat electrode body 80 includes the separator 40 for a battery, the positive electrode 10, and the negative electrode 20. The separator 40 for a battery, the positive electrode 10, and the negative electrode 20 are elongated belt-shaped sheet members. The flat electrode body 80 is obtained by winding the positive electrode 10 and the negative electrode 20 together with the separator 40 for a battery interposed therebetween in the longitudinal direction and forming the wound body into a flat shape. During winding, a winding tension (tension per cross-sectional area) applied to the separator 40 for a battery is, for example, about 0.35 N/mm$^2$ to 4.3 N/mm$^2$.

For example, when the separator 40 for a battery having a PE single-layer structure includes the porous layer 46 that is formed on a single main surface thereof, it is preferable that the porous layer 46 is disposed to face the positive electrode 10 in order to prevent the oxidation of PE. In the case of the laminated separator having a three-layer structure of PP layer/PE layer/PP layer, the porous layer 46 may be disposed to face the positive electrode 10 or the negative electrode 20.

Figure 8:
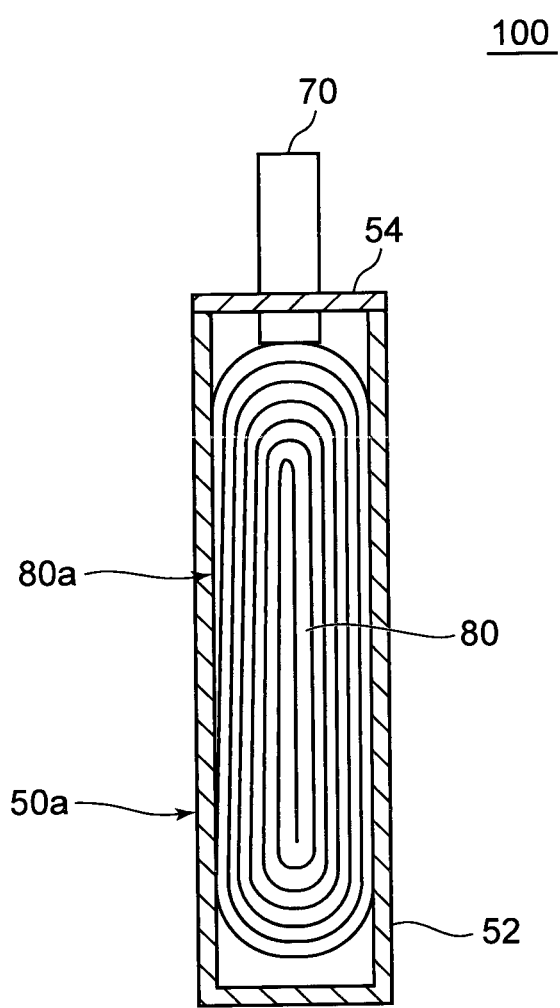
FIG. 8 is a schematic sectional view taken along line VIII-VIII of FIG. 6.

The flat electrode body 80 includes the flat portion 80a. FIG. 8 is a schematic sectional view taken along line VIII-VIII of FIG. 6. Referring to FIG. 8, in the flat portion 80a, plate portions including the separator for a battery, the positive electrode, and the negative electrode are laminated. The number of layers laminated in the separator 40 for a battery of the flat portion 80a is, for example, about 100 to 150. The flat portion 80a comes into direct or indirect contact with the main surface walls 50a of the square case 50. Here, "coming into indirect contact with" implies, for example, a configuration in which the flat portion 80a is accommodated in the square case 50 in a state where the flat electrode body 80 is coated with a packing material formed of PE.

By the flat portion 80a coming into contact with the main surface walls 50a, a pressure is applied to the flat electrode body 80 from the main surface walls 50a. Due to this pressure, the separator 40 for a battery may collapse, and input and output characteristics and safety deteriorate under ordinary conditions in the related art. However, the separator 40 for a battery satisfies the above-described specific conditions and thus is not likely to collapse. Even when the separator 40 for a battery collapses, high input and output characteristics and safety can be exhibited. Hereinafter, each component constituting the single cell 100 will be described.

[Positive Electrode]

Figure 10:
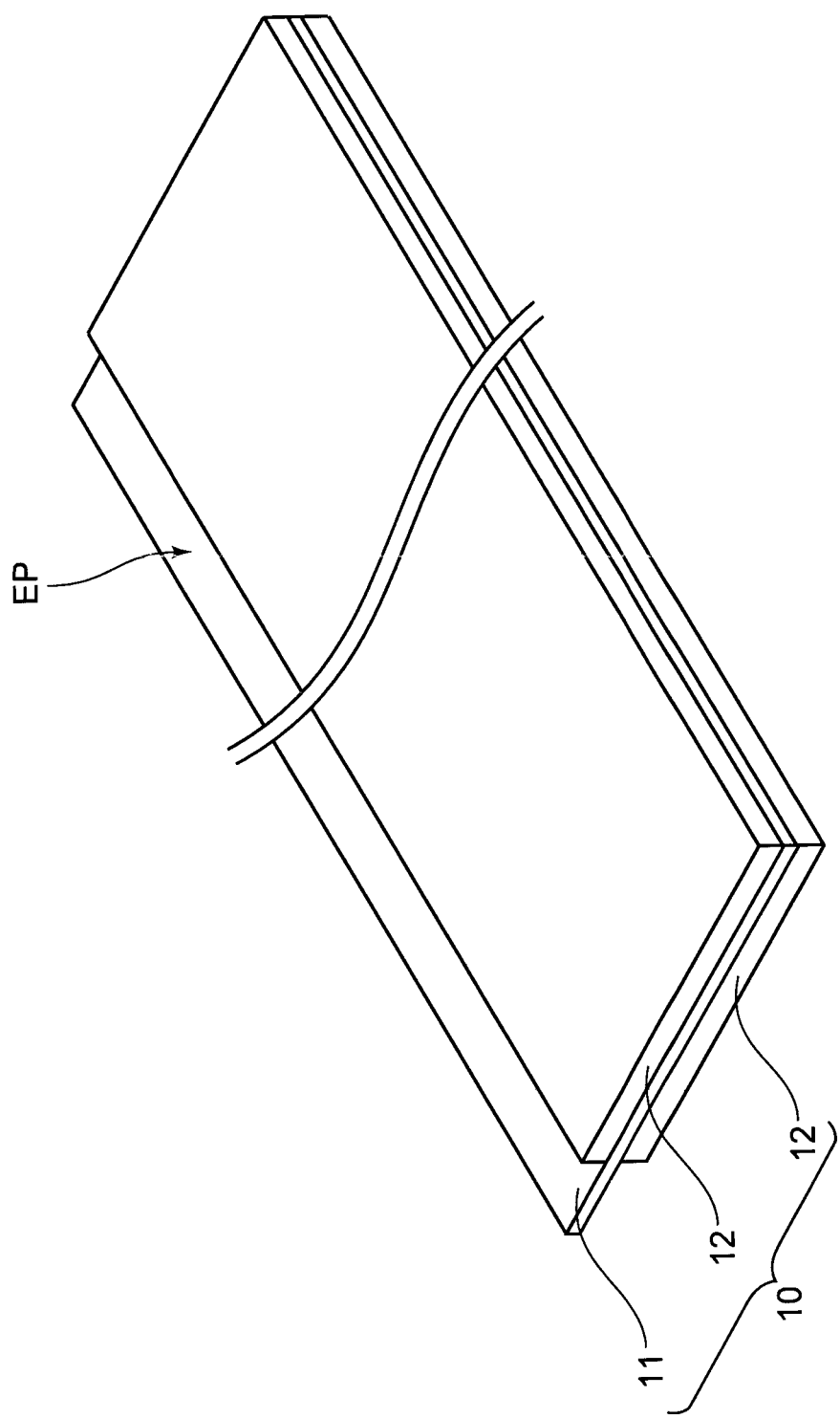
FIG. 10 is a schematic diagram showing a configuration example of a positive electrode according to an embodiment of the invention.

FIG. 10 is a schematic diagram showing a configuration example of the positive electrode 10. Referring to FIG. 10, the positive electrode 10 includes an elongated belt-shaped positive electrode current collector foil 11 and a positive electrode mixture layer 12 that is formed on opposite main surfaces of the positive electrode current collector foil 11. The positive electrode current collector foil 11 is, for example, Al foil having a thickness of about 15 μm.

The positive electrode 10 can be manufactured using a well-known method of the related art. For example, using a die coater, a positive electrode mixture paste obtained by dispersing a positive electrode mixture in a predetermined solvent (for example, NMP) is applied to the opposite main surfaces of the positive electrode current collector foil 11 and is dried. As a result, the positive electrode 10 can be manufactured. The coating weight of the positive electrode mixture layer 12 (the mass applied per unit area) is, for example, 9.8 mg/cm$^2$ to 15.2 mg/cm$^2$.

Further, the dried positive electrode mixture layer 12 may be pressed using a rolling mill or the like to adjust the thickness and the mixture density thereof. The mixture density of the positive electrode mixture layer 12 is, for example, 1.8 g/cm$^3$ to 2.4 g/cm$^3$. At this time, the thickness of the positive electrode 10 (the total thickness of the positive electrode current collector foil 11 and the positive electrode mixture layer 12) is, for example, about 40 μm to 100 μm.

The positive electrode mixture layer 12 is formed by attaching a positive electrode mixture containing a positive electrode active material, a conductive material, and a binder to the main surfaces of the positive electrode current collector foil 11. The positive electrode active material is not particularly limited, and any material which can function as a positive electrode active material of a lithium ion secondary battery can be used. For example, LiCoO$_2$, LiNiO$_2$, LiNi$_a$Co$_b$O$_2$ (wherein, a+b=1, 0<a<1, and 0<b<1), LiMnO$_2$, LiMn$_2$O$_4$, LiNi$_a$Co$_b$Mn$_c$O$_2$ (wherein, a+b+c=1, 0<a<1, 0<b<1, and 0<c<1), or LiFePO$_4$ can be used. A ratio of the mass of the positive electrode active material to the mass of the positive electrode mixture is, for example, about 80 mass % to 98 mass %.

As the conductive material, for example, acetylene black (AB) or graphite can be used. A ratio of the mass of the conductive material to the mass of the positive electrode mixture is, for example, about 1 mass % to 10 mass %. As the binder, for example, PVDF, or PTFE can be used. A ratio of the mass of the binder to the mass of the positive electrode mixture is, for example, about 1 mass % to 10 mass %.

[Negative Electrode]

Figure 11:
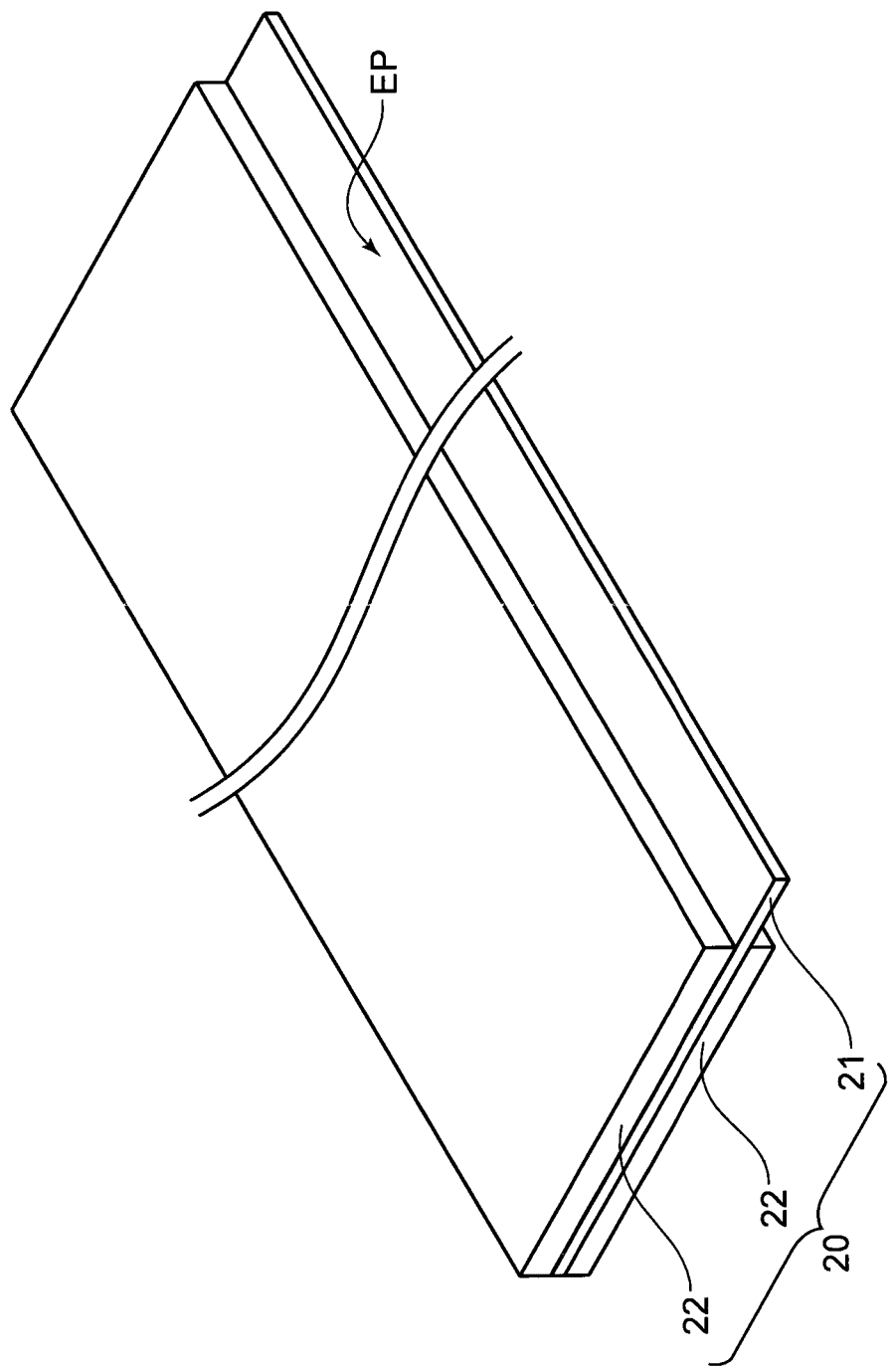
FIG. 11 is a schematic diagram showing a configuration example of a negative electrode according to an embodiment of the invention.

FIG. 11 is a schematic diagram showing a configuration example of the negative electrode 20. Referring to FIG. 11, the negative electrode 20 includes an elongated belt-shaped negative electrode current collector foil 21 and an elongated belt-shaped negative electrode mixture layer 22 that is formed on opposite main surfaces of the negative electrode current collector foil 21. The negative electrode current collector foil 21 is, for example, copper (Cu) foil having a thickness of about 10 μm.

The negative electrode 20 can be manufactured using a well-known method of the related art. For example, using a die coater, a negative electrode mixture paste obtained by dispersing a negative electrode mixture in a predetermined solvent (for example, water) is applied to the opposite main surfaces of the negative electrode current collector foil 21 and is dried. As a result, the negative electrode 20 can be manufactured. The coating weight of the negative electrode mixture layer 22 is, for example, 4.8 mg/cm$^2$ to 10.2 mg/cm$^2$.

Further, the dried negative electrode mixture layer 22 may be pressed using a rolling mill or the like to adjust the thickness and the mixture density thereof. The mixture density of the negative electrode mixture layer 22 is, for example, 0.8 g/cm$^3$ to 1.4 g/cm$^3$. At this time, the thickness of the negative electrode 20 (the total thickness of the negative electrode current collector foil 21 and the negative electrode mixture layer 22) is, for example, about 50 μm to 150 μm.

The negative electrode mixture layer 22 is formed by attaching a negative electrode mixture containing a negative electrode active material, a thickener, and a binder to the main surfaces of the negative electrode current collector foil 21. The negative electrode active material is not particularly limited, and any material which can function as a negative electrode active material of a lithium ion secondary battery can be used. For example, a carbon-based negative electrode active material such as graphite, amorphous coated graphite, or coke; or an alloy-based negative electrode active material such as silicon (Si) or tin (Sn) can be used. A ratio of the mass of the negative electrode active material to the mass of the negative electrode mixture is, for example, 90 mass % to 99 mass %.

The thickener and the binder are not particularly limited. As the thickener, for example, CMC or MC can be used. As the binder, for example, SBR or PTFE can be used. A ratio of the mass of the thickener and the binder to the mass of the negative electrode mixture is, for example, 1 mass % to 10 mass %.

The positive electrode capacity and the negative electrode capacity are adjusted by selecting the active material and by adjusting the coating weight. In consideration of charging-discharging cycle life, a capacity ratio (negative electrode capacity/positive electrode capacity) of the negative electrode to the positive electrode is, for example, about 1.7 to 2.0.

[Electrolytic Solution]

The electrolytic solution is obtained by dissolving a Li salt in an aprotic solvent. Examples of the aprotic solvent which can be used include cyclic carbonates such as ethylene carbonate (EC), propylene carbonate (PC), butylene carbonate (BC), and γ-butyrolactone (γBL); and chain carbonates such as dimethyl carbonate (DMC), ethyl methyl carbonate (EMC), and diethyl carbonate (DEC). Among these aprotic solvents, a combination of two or more kinds is preferable from the viewpoints of electrical conductivity and electrochemical stability. In particular, a mixture of a cyclic carbonate and a chain carbonate is preferably used. At this time, a volume ratio of the cyclic carbonate to the chain carbonate is preferably 1:9 to 5:5.

As the Li salt, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), or lithium trifluoromethanesulfonate ($LiCF_3SO_3$) can be used. Among these Li salts, a combination of two or more kinds may be used. The concentration of the Li salt in the electrolytic solution is not particularly limited and is preferably 0.7 mol/L to 1.5 mol/L from the viewpoint of improving input and output characteristics and safety.

The electrolytic solution may contain an additive to form a high-quality solid electrolyte interface (SEI) on a surface of the negative electrode active material. Examples of the additive include Li salts containing an oxalato complex as an anion such as lithium bis(oxalato)borate ($LiB(C_2O_4)_2$), lithium difluoro(oxalato)borate ($LiBF_2(C_2O_4)$), and lithium difluorobis(oxalato)phosphate ($LiPF_2(C_2O_4)_2$); and other additives such as lithium difluorophosphate ($LiPO_2F_2$), vinylene carbonate (VC), vinyl ethylene carbonate (VEC), fluoroethylene carbonate (FEC), ethylene sulfite (ES), propane sultone (PS), and lithium bis(trifluoromethanesulfonyl) imide ($Li(CF_3SO_2)_2N$).

Fourth Embodiment: Battery Pack

A fourth embodiment relates to a battery pack including plural single cells each of which is the lithium ion secondary battery according to the third embodiment.

Figure 12:
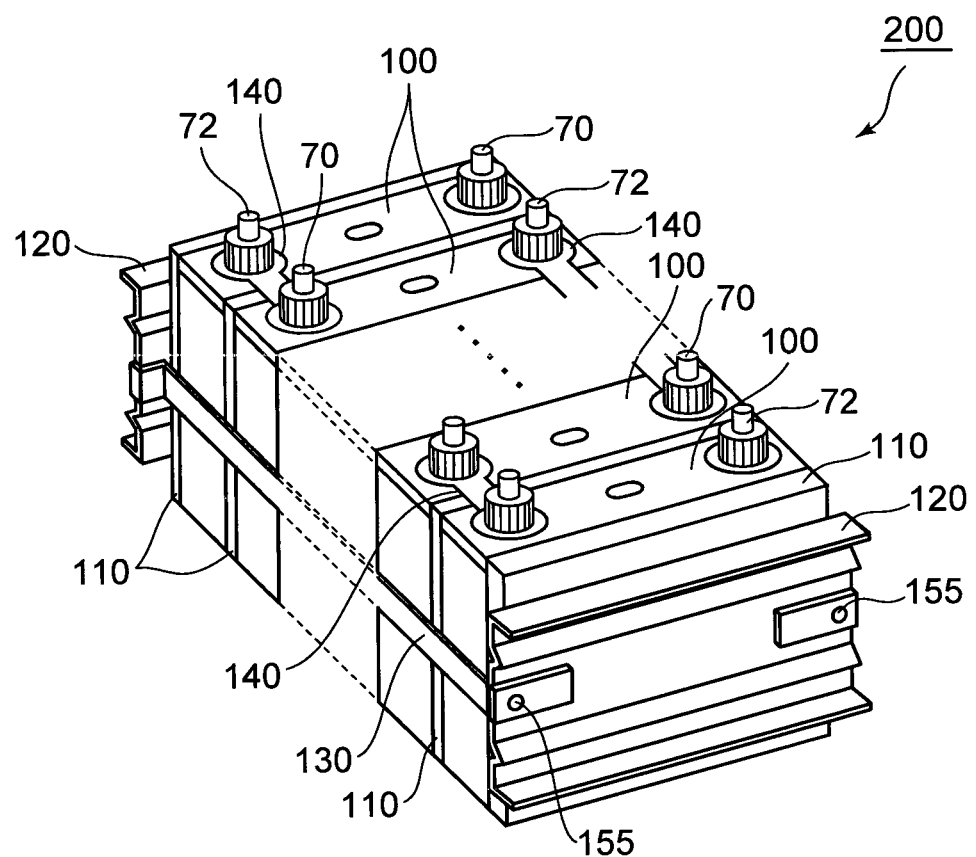
FIG. 12 is a schematic diagram showing a configuration example of a battery pack according to an embodiment of the invention.

FIG. 12 is a schematic diagram showing a configuration example of the battery pack according to the embodiment. Referring to FIG. 12, the battery pack 200 includes two or more of the single cells 100. The number of single cells 100 included in the battery pack 200 is appropriately changed such that a desired voltage can be obtained.

Figure 13:
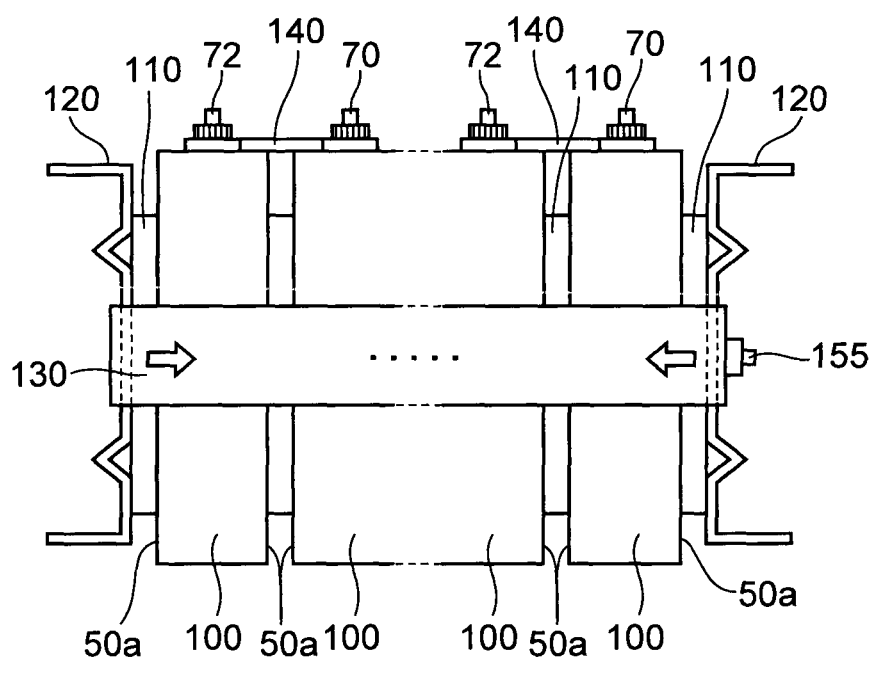
FIG. 13 is a side view showing the battery pack of FIG. 12.

The plural single cells 100 are reversed in direction every second one such that the positive electrode terminals 70 and the negative electrode terminals 72 are alternately arranged, and are arranged in a direction (laminating direction) in which the main surface walls 50a (refer to FIG. 13) face each other. Among two adjacent single cells 100, a connection member 140 (bus bar) connects the positive electrode terminal 70 of one single cell 100 to the negative electrode terminal 72 of another single cell 100. A cooling plate 110 for improving heat dissipation is interposed between the adjacent single cells 100. The cooling plate 110 has comb-shaped convex and concave portions on a surface thereof.

The battery pack 200 includes a restraining member. The restraining member includes restraining plates 120, a restraining band 130, and screws 155. The restraining plates 120 are arranged at opposite ends of the arrangement of the single cells 100, respectively. The restraining band 130 is attached so as to bridge the two restraining plates 120. By fastening end portions of the restraining band 130 through the screws 155, the outside of each of the single cells 100 is restrained, and a restraining pressure is applied in an arrangement direction AD of the single cells 100 (refer to FIG. 13). At this time, substantially the same restraining pressure is applied to the respective single cells 100 included in the battery pack 200.

In the embodiment, each of the single cells 100 is restrained such that a pressure of 0.05 $kN/cm^2$ to 0.5 $kN/cm^2$ is applied to the flat portion 80a of the flat electrode body 80 included in each of the single cells 100. In the embodiment, each of the single cells 100 includes the separator 40 for a battery or the laminated separator 45. Therefore, high input and output characteristics and safety can be ensured in such a restrained environment.

Here, "the value of restraining pressure" refers to a value obtained by dividing a pressing force applied from the restraining member to the main surface walls 50a by the area of the flat portion 80a. When the restraining pressure is lower than 0.05 $kN/cm^2$, the deformation of the single cells 100 may not be sufficiently suppressed. When the restraining pressure is higher than 0.5 $kN/cm^2$, the separator 40 for a battery or the like is excessively pressed, and thus input and output characteristics and the like may deteriorate. The restraining pressure is more preferably 0.1 $kN/cm^2$ to 0.4 $kN/cm^2$ and still more preferably 0.2 $kN/cm^2$ to 0.4 $kN/cm^2$.

Hereinabove, the embodiment has been described using a square battery as an example. However, the embodiment is not limited to a square battery and may also be applied to a cylindrical battery or a laminate battery. The flat electrode body is not limited to a wound electrode body and may also be applied to a laminated electrode body (also referred to as "stacked electrode body").

EXAMPLES

Hereinafter, the embodiments will be described in more detail using Examples. However, the embodiments are not limited to the following Examples.

[Preparation of Separator for Battery: Samples A1 to A20 and B1 to B4]

An original sheet formed of PE was obtained by extrusion. The original sheet was drawn and annealed under conditions shown in Table 1 of FIG. 14 and Table 2 of FIG. 15. In this way, separators for a battery having a PE single-layer structure (Samples A1 to A20 and B1 to B4) were obtained. Here, Samples A1 to A20 correspond to Examples, and Samples B1 to B4 correspond to Comparative Examples.

Using the above-described methods, the resin occupancy s, the thickness d, and the linearity index of each of the samples were measured. At this time, the observation magnification of an SEM was set as 30,000 times, and the resin occupancy s was obtained by performing the measurement three times and obtaining the arithmetic mean value thereof. The linearity index was calculated from 15 resin fibers. The results are shown in Table 1 of FIG. 14 and Table 2 of FIG. 15.

[Preparation of Laminated Separator: Samples A21 to A25 and B5]

An original sheet formed of PE and PP was obtained by extrusion. The original sheet was drawn and annealed under conditions shown in Table 3 of FIG. 16. In this way, laminated separators having a three-layer structure of PP layer (first layer)/PE layer (second layer)/PP layer (third layer) (Samples A21 to A25 and B5) were obtained. Here, Samples A21 to A25 correspond to Examples, and Sample B5 corresponds to a comparative example.

Using the same methods as in Sample A1 and the like, the resin occupancy s and the thickness d of each layer included in the laminated separator was measured, and the linearity index of a layer having the highest resin occupancy s was measured. The results are shown in Table 3 of FIG. 16. In Table 3, the value of "d×s" is the value measured in the layer having the highest resin occupancy s.

[Preparation of Lithium Ion Secondary Battery]

Using the respective samples (the separator for a battery or the laminated separator) described above, lithium ion secondary batteries for evaluation were prepared. The specification of each member of the batteries for evaluation will described below.

1. Positive Electrode (Refer to FIG. 10)
Positive electrode active material: $LiNi_{1/3}Co_{1/3}Mn_{1/3}O_2$
Conductive material: acetylene black
Binder: PVDF
Coating weight: 11 mg/cm$^2$
Mixture density: 2.2 g/cm$^3$
Positive electrode current collector foil: Al foil having a thickness of 15 μm
Thickness of positive electrode: 70 μm 2. Negative Electrode (Refer to FIG. 11)
Negative electrode active material: amorphous coated graphite
Thickener: CMC
Binder: SBR
Coating weight: 7.5 mg/cm$^2$
Mixture density: 1.1 g/cm$^3$
Negative electrode current collector foil: Cu foil having a thickness of 10 μm
Thickness of Negative Electrode: 80 μm 3. Porous Layer (Refer to FIGS. 4 and 5)
Inorganic filler: alumina (D50=0.7 μm, specific surface area=15 m$^2$/g), boehmite (D50=1.0 μm, specific surface area=10 m$^2$/g)
Thickener: CMC
Binder: acrylic resin
Thickness of porous layer: shown in Tables 1 to 3 of FIGS. 14 to 16

4. Flat Electrode Body (Refer to FIGS. 7 and 9)
Width W: 130 mm
Height H: 50 mm
Winding tension applied to separator during winding: 0.35 N/mm$^2$ to 4.3 N/mm$^2$ 5. Electrolytic Solution
Li salt: $LiPF_6$ (1.1 mol/L)
Solvent: mixed solvent of EC:EMC:DMC=3:3:4 (volume ratio)
Additive: $LiB(C_2O_4)_2$ and $LiPO_2F_2$ 6. Capacity Design
Capacity ratio of negative electrode to positive electrode: 1.85
Rated capacity: 4 Ah

[Evaluation]

Assuming the use in a battery pack, the batteries for evaluation were evaluated in a state of being restrained by a restraining jig. The restraining pressures applied to the respective batteries are shown in Tables 1 to 3 of FIGS. 14 to 16. In the following description, the unit "C" for the current value refers to the current value at which the rated capacity of a battery is completely discharged in 1 hour.

1. Evaluation of Input and Output Characteristics

The input and output characteristics of each of the batteries were evaluated by performing a high-load charging-discharging cycle test in a low-temperature environment. A charging-discharging cycle in which the following "charging-rest-discharging" was set as one cycle was repeated 4000 times. The IV resistances before and after the test were measured to calculate a resistance increase. Here, the IV resistance was obtained from a slope of an I-V line (an approximate straight line obtained using a least-square method) after discharging each of the batteries in a state of charge (SOC) of 60% at 25° C. at a current value of 0.5 C, 1.0 C, 2.0 C, or 3.0 C. The results are shown in "IV Resistance Increase" of Tables 1 to 3 of FIGS. 14 to 16. It can be said that the lower the IV resistance increase, the better input and output characteristics.

(Cycle Conditions)
Temperature environment: −30° C.
Charging: 30 C×0.1 sec
Rest: 30 seconds
Discharging: 0.5 C×10 sec 2. Evaluation of Safety The safety of each of the batteries was evaluated by performing an overcharge test. A test method was as follows. A thermocouple was attached to a main surface wall of each of the batteries. While monitoring the battery voltage and the battery temperature, the battery was charged at a constant current of 10 C until shutdown occurred. A battery temperature T1 immediately after the shutdown and a battery temperature T2 1 minute after the shutdown were measured. By dividing T2 by T1, a temperature increase after the shutdown was calculated. The results are shown in "Temperature Increase after SD" of Tables 1 to 3 of FIGS. 14 to 16. It can be said that the lower the temperature increase after SD, the higher the withstand voltage during overcharge, that is, the higher the safety.

[Results and Discussion]

1. Separator for Battery (Samples A1 to A20 and B1 to B4)

It was found from Tables 1 and 2 of FIGS. 14 and 15 that, in Samples A1 to A20 in which 0<s≤100, 3≤d≤50, and 300≤d×s≤1500 were satisfied and the linearity index was 80% or higher, input and output characteristics and safety were superior as compared to Samples B1 to B4 in which the above-described conditions were not satisfied.

2. Laminated Separator (Samples A21 to A25 and B5)

It was found from Table 3 of FIG. 16 that, in Samples A21 to A25 in which $0<s\leq100$, $30\leq d\leq50$, and $300\leq d\times s\leq1500$ were satisfied and the linearity index was 80% or higher of the layer having the highest resin occupancy s, input and output characteristics and safety were superior as compared to Sample B5 in which the above-described conditions were not satisfied.

Hereinabove, the embodiments and Examples of the invention have been described. However, the embodiments and Examples disclosed herein are merely exemplary in all respects and are not particularly limited. The scope of the invention is defined not by the above description but by claims, and equivalent meanings to claims and modifications within claims are intended to be embraced therein.

What is claimed is:

1. A belt-shaped sheet member separator for a battery comprising:
    a first main surface;
    a second main surface positioned on a side opposite to the first main surface; and
    a plurality of resin fibers, each of the plurality of resin fibers extending from the first main surface to the second main surface, so as to connect the first main surface and the second main surface in a thickness direction of the belt-shaped sheet member separator, wherein
    each of the plurality of resin fibers has a length of a distance d (μm), which is a thickness of the belt-shaped sheet member separator, from the first main surface to the second main surface,
    the distance d is within the range of $3\leq d\leq50$,
    when a ratio of a total combined length of individual line segments, each of the individual line segments representing the length of a cross-section of respective ones of the plurality of resin fibers in which a first straight line, parallel to the first main surface and the second main surface, intersects with the plurality of the resin fibers, to a total length of the first straight line is represented by s (%), the following conditions are satisfied: $0<s\leq100$, and $300\leq d\times s\leq1500$;
    when a second straight line, parallel to the first main surface and the second main surface, positioned at a distance of 10% of the thickness of the belt-shaped sheet member separator from the first main surface is set as a first reference line, a third straight line, parallel to the first main surface and the second main surface, positioned at a distance of 10% of the thickness of the belt-shaped sheet member separator from the second main surface is set as a second reference line, first line segments, each representing the length of a cross-section of a resin fiber of the plurality of resin fibers, in which the respective plurality of resin fibers intersects with the first reference line, are set as first line segments, and second line segments, in which a band-shaped region extending from the first line segments in the thickness direction of the belt-shaped sheet member separator intersects with the second reference line, are set as second line segments, each of third line segments, each representing the length of a cross-section of a resin fiber of the plurality of resin fibers, in which the respective plurality of resin fibers intersects with the respective second line segments accounts for 80% or more of the respective second line segments, and
    the plurality of resin fibers are formed of polyethylene (PE) or polypropylene (PP).

2. The belt-shaped sheet member separator for the battery according to claim 1, wherein
    a condition of $20\leq s\leq80$ is satisfied.

3. The belt-shaped sheet member separator for the battery according to claim 1, wherein
    a fiber diameter of each of the plurality of resin fibers is 0.05 μm to 2 μm.

4. The belt-shaped sheet member separator for the battery according to claim 1, further comprising
    a porous layer that is provided on at least one of the first main surface and the second main surface, wherein
    the porous layer includes an inorganic filler and a binder.

5. A laminated separator comprising
    the belt-shaped sheet member separator for the battery according to claim 1.

6. A lithium ion secondary battery comprising
    the belt-shaped sheet member separator according to claim 1.

7. A lithium ion secondary battery comprising a belt-shaped sheet member separator for a battery, the belt-shaped sheet member separator for the battery comprising
    a first main surface;
    a second main surface positioned on a side opposite to the first main surface; and
    a plurality of resin fibers, each of the plurality of resin fibers extending from the first main surface to the second main surface, so as to connect the first main surface and the second main surface in a thickness direction of the belt-shaped sheet member separator, the plurality of resin fibers being formed of polyethylene (PE) or polypropylene (PP), wherein
    each of the plurality of resin fibers has a length of a distance d (μm), which is a thickness of the belt-shaped sheet member separator, from the first main surface to the second main surface,
    the distance d is within the range of $3\leq d\leq50$,
    when a ratio of a total combined length of individual line segments, each of the individual line segments representing the length of a cross-section of respective ones of the plurality of resin fibers in which a first straight line, parallel to the first main surface and the second main surface, intersects with the plurality of resin fibers, to a total length of the first straight line is represented by s (%), the following conditions are satisfied: $0<s\leq100$, and $300\leq d\times s\leq1500$;
    when a second straight line, parallel to the first main surface and the second main surface, positioned at a distance of 10% of the thickness of the belt-shaped sheet member separator from the first main surface is set as a first reference line, a third straight line, parallel to the first main surface and the second main surface, is positioned at a distance of 10% of the thickness of the belt-shaped sheet member separator from the second main surface is set as a second reference line, first line segments, each representing the length of a cross-section of a resin fiber of the plurality of resin fibers, in which the respective plurality of resin fibers intersects with the first reference line, are set as first line segments, and second line segments, in which a band-shaped region extending from the first line segments in the thickness direction of the belt-shaped sheet member separator intersects with the second reference line, are set as second line segments, each of third line segments, each representing the length of a cross-section of a resin fiber of the plurality of resin fibers, in which the respective plurality of resin fibers intersects with the respective second line segments, accounts for 80% or more of the respective second line segments, and
the lithium ion secondary battery further comprises
a flat electrode body in which an elongated belt-shaped positive electrode and an elongated belt-shaped negative electrode are wound together with the belt-shaped sheet member separator interposed between the positive electrode and the negative electrode, and
a square case that accommodates the flat electrode body, the flat electrode body includes a flat portion in which plate portions including the belt-shaped sheet member separator, the positive electrode, and the negative electrode are laminated, and
the square case includes a pair of main surface walls facing the flat portion.

8. A battery pack comprising:
a plurality of single cells; and
a restraining member that restrains outsides of the single cells, wherein
each of the single cells is a lithium ion secondary battery which comprises:
a belt-shaped sheet member separator comprising
a first main surface;
a second main surface positioned on a side opposite to the first main surface; and
a plurality of resin fibers, each of the plurality of resin fibers extending from the first main surface to the second main surface, so as to connect the first main surface and the second main surface in a thickness direction of the belt-shaped sheet member separator, the plurality of resin fibers being formed of polyethylene (PE) or polypropylene (PP), wherein
each of the plurality of resin fibers has a length of a distanced (μm), which is a thickness of the belt-shaped sheet member separator, from the first main surface to the second main surface,
the distance d is within the range of 3
when a ratio of a total combined length of individual line segments, each of the individual line segments representing the length of a cross-section of respective ones of the plurality of resin fibers in which a first straight line, parallel to the first main surface and the second main surface, intersects with the plurality of resin fibers, to a total length of the first straight line is represented by s (%), the following conditions are satisfied: $0 < s \leq 100$, and $300 \leq d \times s \leq 1500$;
when a second straight line, parallel to the first main surface and the second main surface, positioned at a distance of 10% of the thickness of the belt-shaped sheet member separator from the first main surface is set as a first reference line, a third straight line, parallel to the first main surface and the second main surface, is positioned at a distance of 10% of the thickness of the belt-shaped sheet member separator from the second main surface is set as a second reference line, first line segments, each representing the length of a cross-section of a resin fiber of the plurality of resin fibers, in which the respective plurality of resin fibers intersects with the first reference line, are set as first line segments, and second line segments, in which a band-shaped region extending from the first line segments in the thickness direction of the belt-shaped sheet member separator intersects with the second reference line, are set as second line segments, each of third line segments, each representing the length of a cross-section of a resin fiber of the plurality of resin fibers, in which the respective plurality of resin fibers intersects with the respective second line segments, accounts for 80% or more of the respective second line segments, and
a flat electrode body in which an elongated belt-shaped positive electrode and an elongated belt-shaped negative electrode are wound together with the belt-shaped sheet member separator interposed between the positive electrode and the negative electrode, and
a square case that accommodates the flat electrode body,
wherein the flat electrode body includes a flat portion in which plate portions including the belt-shaped sheet member separator, the positive electrode, and the negative electrode are laminated, the square case includes a pair of main surface walls facing the flat portion, and
the flat portion is configured such that a pressure of 0.05 kN/cm$^2$ to 0.5 kN/cm$^2$ is to be applied thereto.

* * * * *